United States Patent Office 3,380,347
Patented Apr. 30, 1968

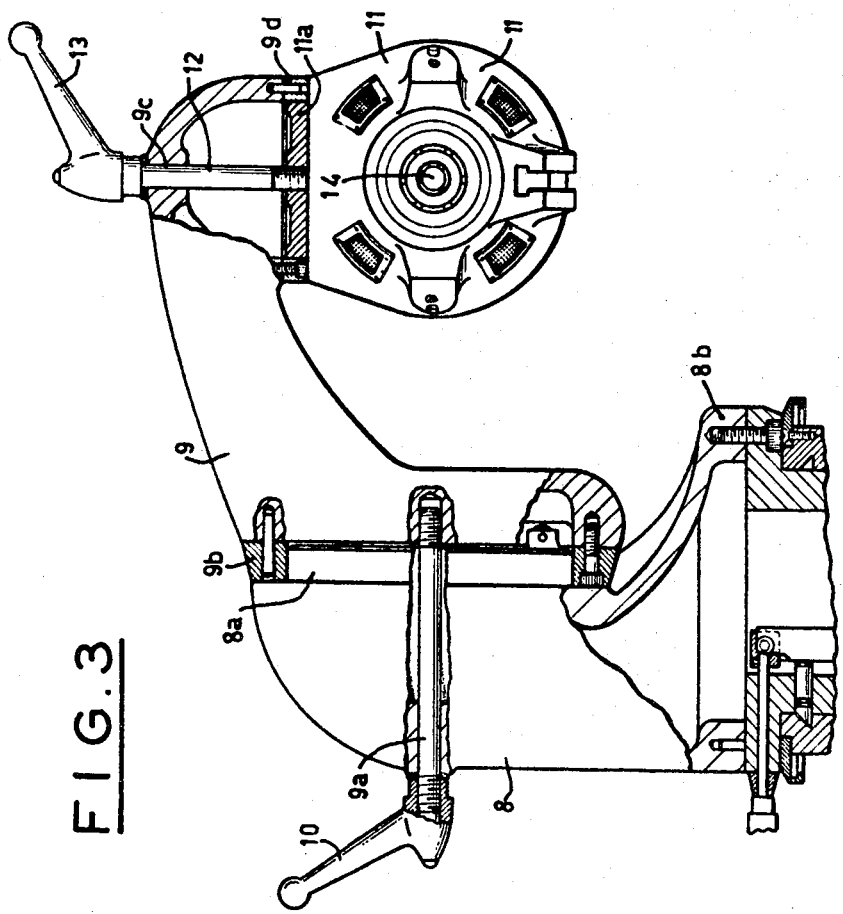

3,380,347
MACHINE TOOL
Robert Habib, 36 Quai Gustave Ador,
Geneva, Switzerland
Filed May 17, 1966, Ser. No. 550,816
Claims priority, application Switzerland, May 21, 1965,
7,138/65
4 Claims. (Cl. 90—17)

ABSTRACT OF THE DISCLOSURE

In a machine tool which has a headstock with a spindle adapted to carry a wheel, the headstock is mounted on a support movable in a horizontal plane, an intermediate arm is pivoted on the support in a vertical plane and connects the headstock to the support. The headstock is pivoted to the arm in a plane perpendicular to the pivoting plane of the arm on the support. The headstock is positioned in such a way that the pivoting axis of the arm on the support passes through the axis of symmetry of the spindle of the headstock, regardless of the angular position of this arm with respect to the support.

---

The present invention has for object a machine tool comprising a headstock carrying a wheel and mounted in a support connected in a horizontal plane, characterised by the fact that this headstock is connected with the support by means of an intermediate arm linked to said support in a vertical plane, the said headstock being linked to said arm in a plane perpendicular to the connecting plane of this arm on the support.

Figure 1:
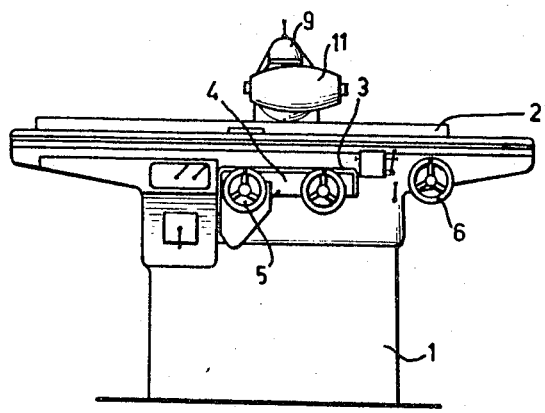
Figure 2:
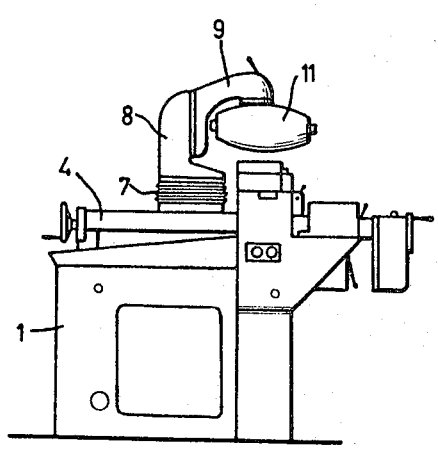

The annexed drawing represents by way of example one embodiment of the present invention:

FIGURE 1 is a front elevation view thereof;
FIGURE 2 is a side view;
FIGURE 3 is a large scale detail view of FIGURE 2.

The machine shown in the drawing comprises a base 1, on the upper part of which is secured a slider (not shown) bearing a table 2, this base being cut by a window 3 through which it is possible to move a second slider 4 moving transversely with respect to table 2.

The movement of table 2, as well as that of slider 4 can be controlled by the action of wheels 5 and 6 or mechanically by means of devices not shown.

Slider 4 bears a column protected by a blower 7, vertically movable and forming the base of a support 8 on one shoulder of which 8a is pivoted an arm 9 secured to support 8 by a rod 9a the lefthand side end of which is threaded (FIGURE 3) and bears a handle 10 permitting, by tightning on rod 9a to block arm 9 in any given angular position.

Graduations provided on the edge of foot 8b of support 8 as well as on that of foot 9b of arm 9 make possible an accurate adjustment of the angular position of these elements.

Arm 9 bears a headstock 11 which is pivoted in a plane perpendicular to the pivoting plane of this arm on support 8.

In effect, headstock 11, which has an oval shape, has on its upper face a cylindrical shoulder 11a by means of which it is engaged in a corresponding opening in arm 9. This shoulder 11a is retained in this opening by a rod 12 to which it is secured and which passes through a hole 9c at its upper end. This end is threaded, not shown in the drawings, and engages with a handle permitting to lock headstock 11 in any given angular position.

This angular position can be adjusted by reading the graduation on ring 9d of arm 9.

When rod 12 occupies a vertical position, its axis cuts the axis of symmetry of rod 9a at the same time as the axis of spindle 14 of headstock 11.

The meeting point of the axes of rod 9a and 12 with that of spindle 14 is such that the spindle is divided into two parts of different lengths.

In the embodiment shown, the headstock is intended to bear a wheel at each end of its spindle. Moreover the length of arm 9 and that of the shorter part of the headstock 11 are such that it is possible to turn the headstock in such a way that the axis of its spindle coincides with that of rod 9a, without the headstock touching the arm 9 (FIGURE 2).

The particular assembly of the wheel-bearing headstock on the machine tool shown renders this machine particularly advantageous since it permits it to perform machining of diverse types at angles which are practically impossible to obtain with present day machines without moving several times the piece to be machined.

What is claimed is:
1. Machine tool, comprising a headstock having a spindle adapted to carry a wheel, said headstock being mounted on a support movable in a horizontal plane; an intermediate arm pivoted on said support in a vertical plane and connecting said headstock to said support; said headstock being pivoted to said arm in a plane perpendicular to the pivoting plane of said arm on said support; said headstock being positioned in such a way that the pivoting axis of said arm on said support passes through the axis of symmetry of the spindle of the headstock, regardless of the angular position of said arm with respect to the support.

2. Machine tool according to claim 1, wherein the pivoting axis of the headstock with said arm cuts the pivoting axis of said arm on said support.

3. Machine tool according to claim 2, comprising a headstock the spindle of which has a wheel at each end, and wherein the pivoting axis of said headstock on said arm cuts said spindle in two parts of different length.

4. Machine tool according to claim 2, wherein said arm is of such a length that it is possible to bring the headstock coaxially with the pivoting axis of this arm on the support without this headstock coming into contact with the arm.

References Cited
UNITED STATES PATENTS

| 1,989,007 | 1/1935 | Gorton | 90—17 |
| 2,116,122 | 5/1938 | Ocenasek | 90—17 X |
| 2,307,222 | 1/1943 | Johnson | 90—17 |

LEONIDAS VLACHOS, *Primary Examiner.*